United States Patent [19]

Song

[11] Patent Number: 5,213,209

[45] Date of Patent: May 25, 1993

[54] ONE TOUCH DRAWER TYPE OPENING AND CLOSING DEVICE FOR A COMPACT DISC STORAGE CASE

[76] Inventor: Jin W. Song, 8-602, Lucky A.P.T, 595-4, Ju-re 1 Dong, Buk-ku, Pusan, Rep. of Korea

[21] Appl. No.: 826,709

[22] Filed: Jan. 28, 1992

[30] Foreign Application Priority Data

Mar. 30, 1991 [KR] Rep. of Korea ............... 91-4391

[51] Int. Cl.⁵ .................................... B65D 85/57
[52] U.S. Cl. ............................................ 206/309
[58] Field of Search ............... 206/309, 444; 312/9.11, 312/9.9

[56] References Cited

U.S. PATENT DOCUMENTS

| | | | |
|---|---|---|---|
| 4,641,747 | 2/1987 | Mestdagh et al. | 206/309 |
| 4,705,166 | 11/1987 | Ackeret | 206/309 |
| 4,738,361 | 4/1988 | Ackeret | 206/309 X |
| 4,804,085 | 2/1989 | Ackeret | 206/309 |
| 4,849,959 | 7/1989 | Jensen | 206/309 X |
| 4,884,685 | 12/1989 | Ackeret | 206/309 |
| 5,000,316 | 3/1991 | Lerner | 206/309 |

Primary Examiner—William I. Price
Attorney, Agent, or Firm—Nikaido, Marmelstein, Murray & Oram

[57] ABSTRACT

This invention relates to a single touch drawer type opening and closing device for a compact disc storage case in which a disc storage drawer is automatically locked during closing and automatically opened when released by the single touch. Also, an opened drawer plate will not be removable from the case. A lock contains a key guiding device which operates in one direction. A drawer plate has a key, a stepped sill, and disc storage space. The drawer plate is inserted into a storage case. A hooking protrusion is located on the storage case. A triangular plate is mounted within the lock to form a key guiding way. A hooking device, formed with a protuberance, is pivotably fixed by a pivot pin. A slide, movably fixed with second hooking devices, is urged by a compression spring. A five sided flat plate key, formed with locking protuberances, is mounted on the drawer. In another embodiment, a rail groove is formed with several steps as a one way direction path. A leaf spring is fixed on the case. A bracket type key is pivotably fixed on the drawer by a pivot pin 18 to thereby be urged by the leaf spring.

3 Claims, 6 Drawing Sheets

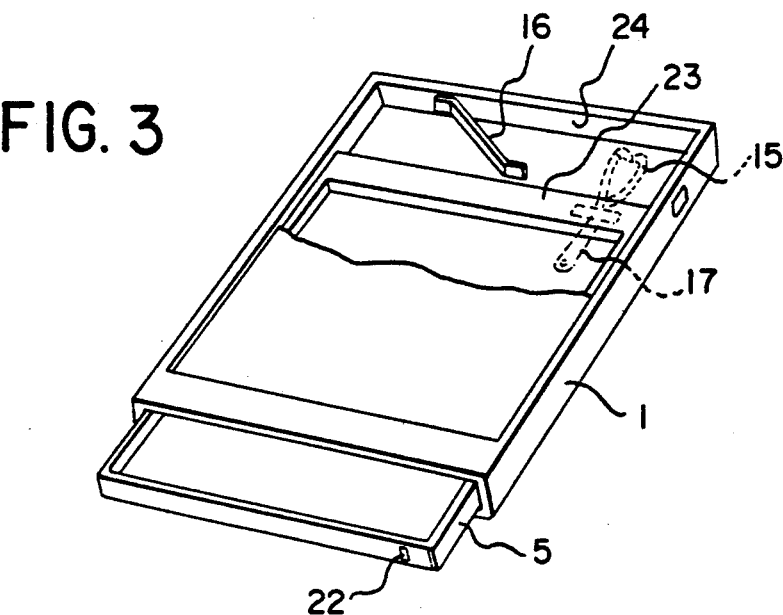
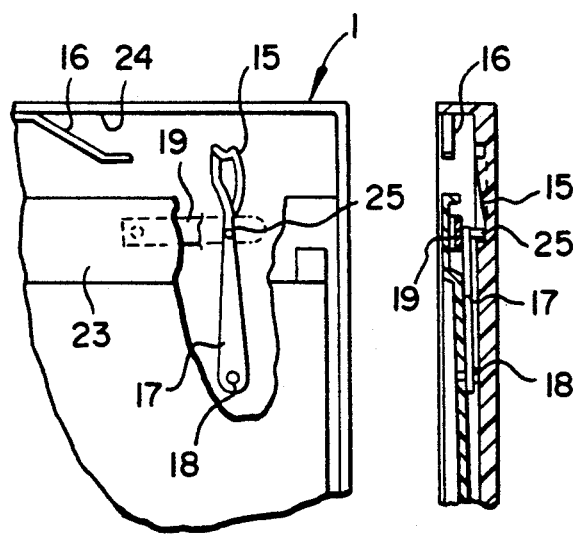
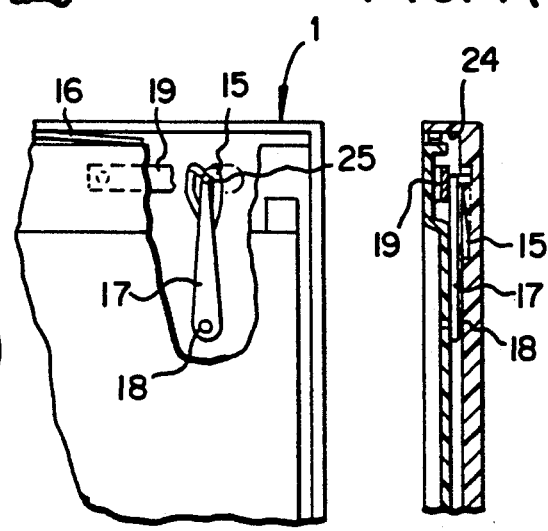

5,213,209

ONE TOUCH DRAWER TYPE OPENING AND CLOSING DEVICE FOR A COMPACT DISC STORAGE CASE

FIELD OF THE INVENTION

The present invention relates to a one touch drawer type opening and closing device for a compact disc storage case formed with an insertion opening at a front end. More particular, the present invention relates to a single touch drawer type opening and closing device for a compact disc storage case in which a drawer in which a disc is placed is automatically locked when the drawer is closed and is automatically opened when released by a single touch. The invention also relates to a device for preventing the opened drawer from being released from the case.

BACKGROUND OF THE INVENTION

According to the conventional disc storage case, a main body of a container and its cover are connected by hinges as shown in FIG. 5. The containers main body and cover should be handled by separately holding them with both hands. When a disc laid therein is removed, the cases containing the disc should be removed from a storage area or arranged place. The cover is opened and a disc is removed. Then, the case is stored separately. After using the disc, it is returned to the case again and then it should be returned to the original place where it was stored. Therefore it was very inconvenient, and further, when a number of cases are arranged and stored, a lot of space is required and a lot of time is required to return the discs.

SUMMARY OF THE INVENTION

The present invention solves the conventional problems. It is an object of the present invention to provide a single touch drawer type opening and closing device for a compact disc storage case such that a disc storage drawer is automatically locked when the drawer is closed and is automatically opened when released by a single touch so that an opening and closing operation is conveniently carried out. The drawer is not removed from the case so that storing and arranging of a number of cases are efficiently carried out.

The foregoing and other objects as well as advantages of the present invention will become clear by the following description of the invention with reference to the accompanying drawings.

BRIEF DESCRIPTION OF THE DRAWINGS

For a better understanding of the invention, and to show how the same may be carried out into effect, reference will now be made, by way of an example, with respect to the accompanying drawings, in which:

FIG. 2(A)–2(F) are fragmentary magnified views for showing an operating state of a preferred embodiment of the present invention, in which FIG. 2(A) shows a released state, FIG. 2(B) shows moving the hooking means toward a locked state, FIG. 2(C) shows a locked state, FIGS. 2(D) shows moving the hooking means toward the released state, FIG. 2(E) is a cross sectional view of a locked state, and FIG. 2(F) is a cross sectional view of a released state, FIG. 3 is a perspective view of another embodiment of the present invention which is partly cut out, FIGS. 4(A)–4(D) are fragmentary magnified views for showing an operating state of FIG. 3, in which FIG. 4(A) shows a released state, FIG. 4(B) shows a closed state, FIG. 4(C) is a schematic view for illustrating a locking operation, and FIG. 4(D) shows the traveling state within the rail groove of the second embodiment.

Throughout the drawings, like reference numerals and symbols are used for designating like or equivalent parts or portions, for simplicity of illustration and explanation.

DETAILED DESCRIPTION OF THE PREFERRED EMBODIMENTS

Figure 1:
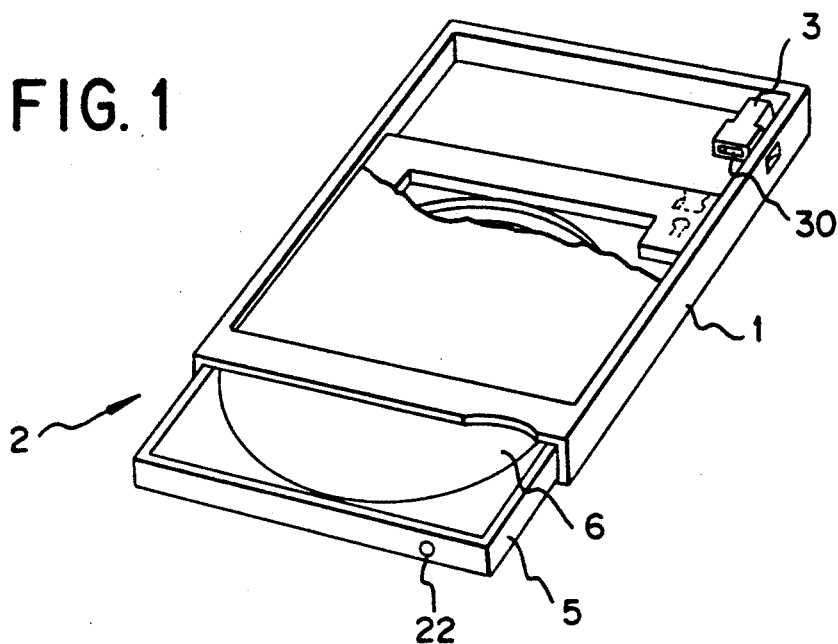
FIG. 1 is a perspective view of a preferred embodiment of the present invention which is partly cut out.

Hereinafter, the preferred embodiments of the present invention will be described in detail with reference to the accompanying drawings.

According to the single touch drawer type opening and closing device for a compact disc storage case of a preferred embodiment of the present invention, a lock 3 having a key guide channel 30 is provided at an innermost right side of a case 1. A triangular plate means 9 having a recess 27 is mounted within the lock 3 and has a key guiding way for operating in one direction around the plate means 9. A slide 12 is urged by a compression spring 13 while a hooking means 10, formed at a front end with a protuberance 10', is mounted by pivot pin 10'' at a center of slide 12. A hooking means 11, 11, formed with hooking projections 11', 11', is movably mounted at a raised portion of both edges of the slide 12. A hooking protrusion 4 is protruded at an inner side of a right side inner wall of the case 1. A disc storage space 6 is defined on a top surface of a drawer plate 5. A five sided " $\bigcirc$ " shaped flat plate key 14 is formed with five locking tuberances 14', 14' on an inner side of a front end. The five sided flat plate key is mounted at an innermost right side of the drawer plate. A stepped sill 7 is provided at a recessed portion of the bottom surface of the drawer.

According to the other embodiment of the present invention, as shown in FIG. 3, a rail groove 15 is formed with a number of steps at an innermost right side of the case 1. A leaf spring 16 is fixed at an inner wall 24 of the inside of the case. A bracket type key 17 is pivotably fixed by a pivot pin 18 at an innermost right side on a bottom surface of the drawer plate 5. The key 17 is urged by a leaf spring 19, so that the structure of the lock may be made simply and conveniently.

Figure 2A:
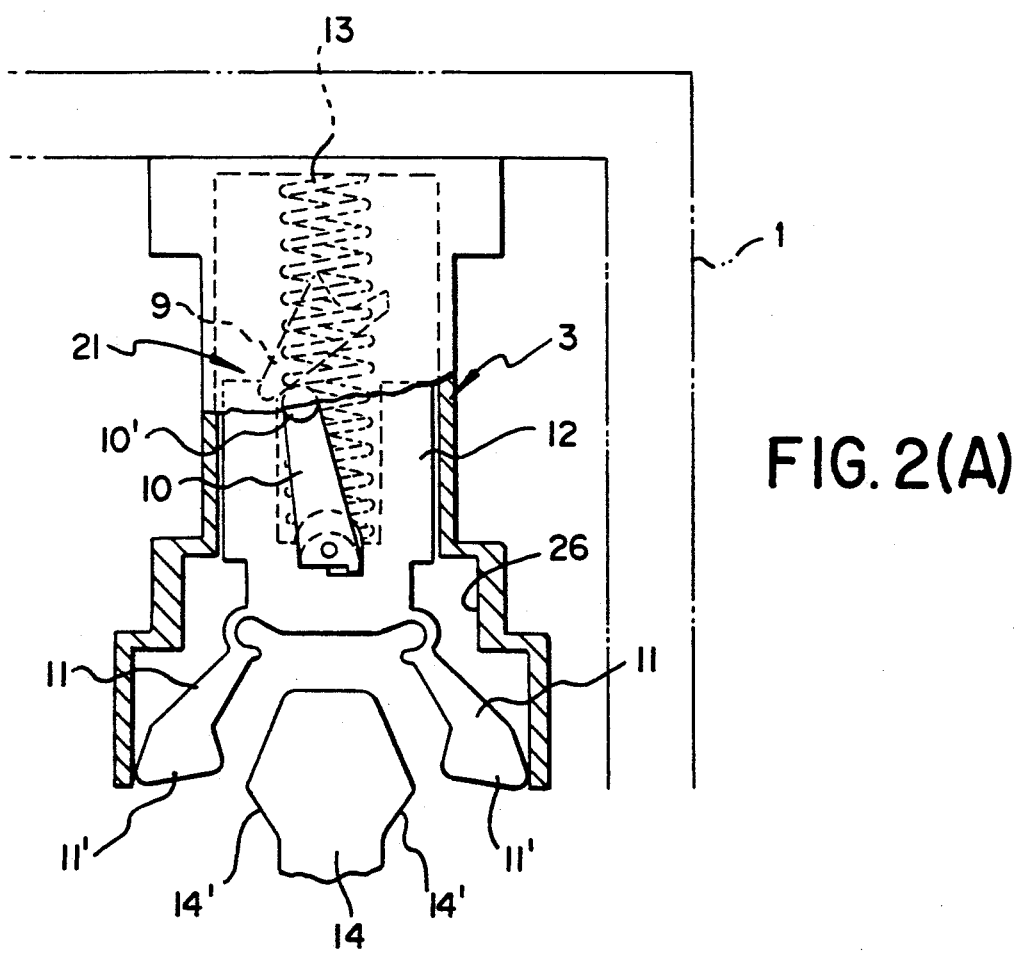
Figure 2B:
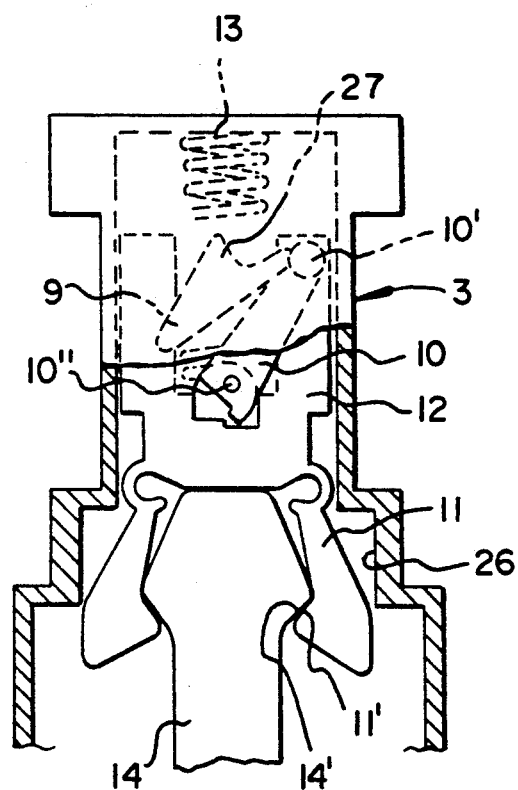
Figure 2C:
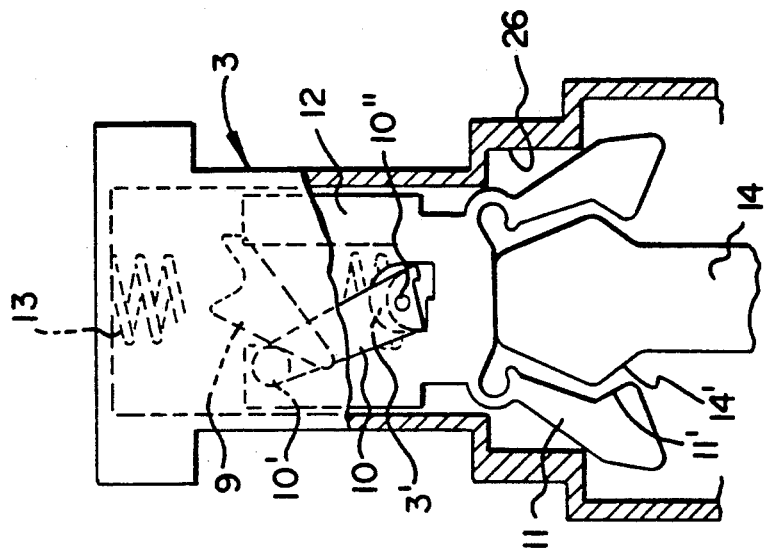
Figure 2D:
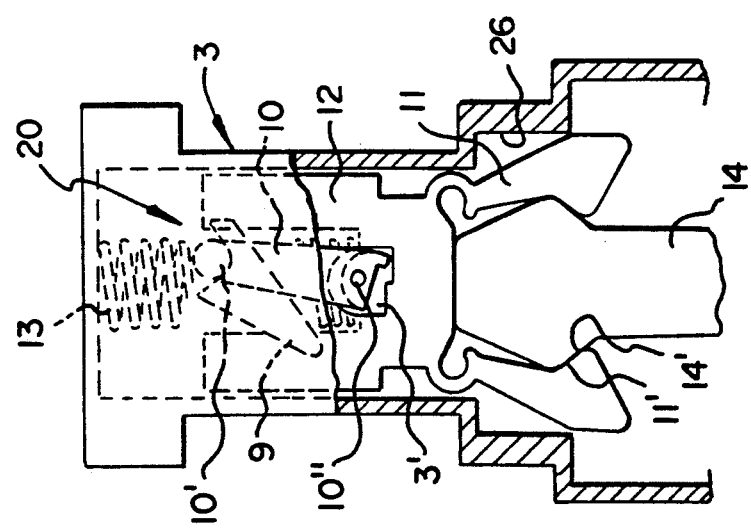
Figure 4C:
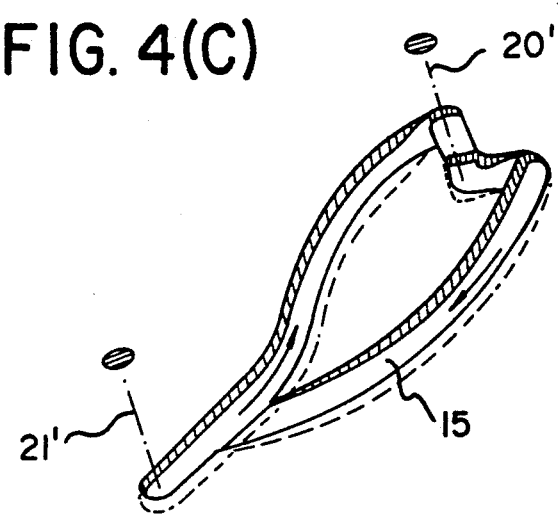

In the drawings in FIGS. 2(C) and 4(C), reference numeral 20 and 20' are upper dead points, in FIGS. 2(A) and 4(C) numerals 21 and 21' are lower dead points and numeral 22 in FIG. 1 is a pressing means.

Figure 2F:
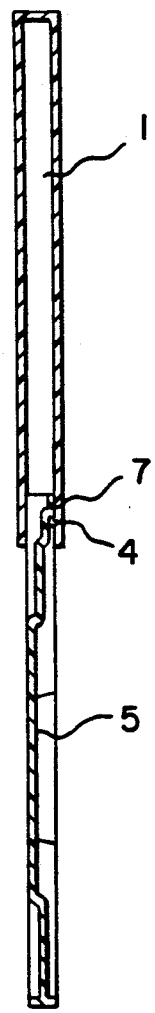
Figure 2E:
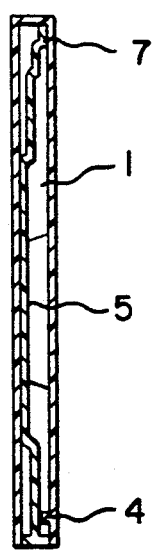

Operation and effect of the present invention will be described in detail as follows:

When a pressing means 22, located at a right hand side of a front surface of the drawer plate 5, is pushed when the drawer plate 5 is opened outward of the case 1, as shown in FIG. 1, the drawer plate 5 is pushed and inserted into the opening at the front of the case 1. The five sided flat plate key 14, which is mounted on the bottom surface of the drawer plate 5, is transferred from a released state of FIGS. 2(A) and 2(F) to a locked state of FIG. 2(C) and 2(E) whereby the drawer is closed. That is, when the five sided flat plate key 14 pushes the slide 12 into the lock 3, both hooking means 11, 11, which are movably mounted to the slide 12, are moved inward as shown in FIG. 2(B) by inner walls 26. The protuberance 10' which is protruded at the front end of the hooking means 10 and which is movably mounted at the center of the slide 12, reaches the upper dead point 20 as shown in FIG. 2(C) along the peripheral edge of the triangular plate 9 as shown in FIG. 2(B). At this moment, the locking protuberances 14', 14'of the five sided flat plate key 14 are clamped by the hooking projections 11', 11'of both hooking means 11, 11 thereby becoming locked. When releasing the locked state in order to open the drawer plate 5, the pressing means 22 of the drawer plate 5 is again pushed inward whereby the protuberance 10' of the hooking means 10 is released out of the upper dead point 20 releasing the locking state. The protuberance 10' of the hooking means 10 advances in one direction along the peripheral edge of the triangular plate 9 as shown in FIG. 2(B). As the protuberance 10' of the hooking means 10 reaches the lower dead point 21, the slide 12 is urged downward by the compression spring 13 to return to the original location. At the same time, the five sided flat plate key 14, which has been hooked to the hooking protrusions 11', 11' of the hooking means 11, 11, is released thereby also returning to an original state. The drawer is automatically locked closed by a single touch and is automatically opened by releasing the drawer with a single touch. The stepped sill 7 stepwisely fixed on the bottom surface of the drawer plate 5 is hooked by the hooking protrusion 4 of the case 1 when in a state that the drawer plate 5 is opened as shown in FIG. 2(F) whereby the removal of the drawer plate 5 is prevented.

Figure 4D:
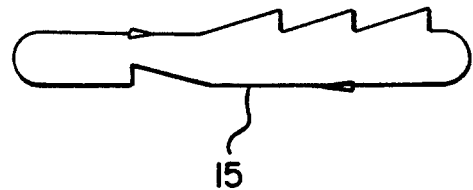
Figure 5:
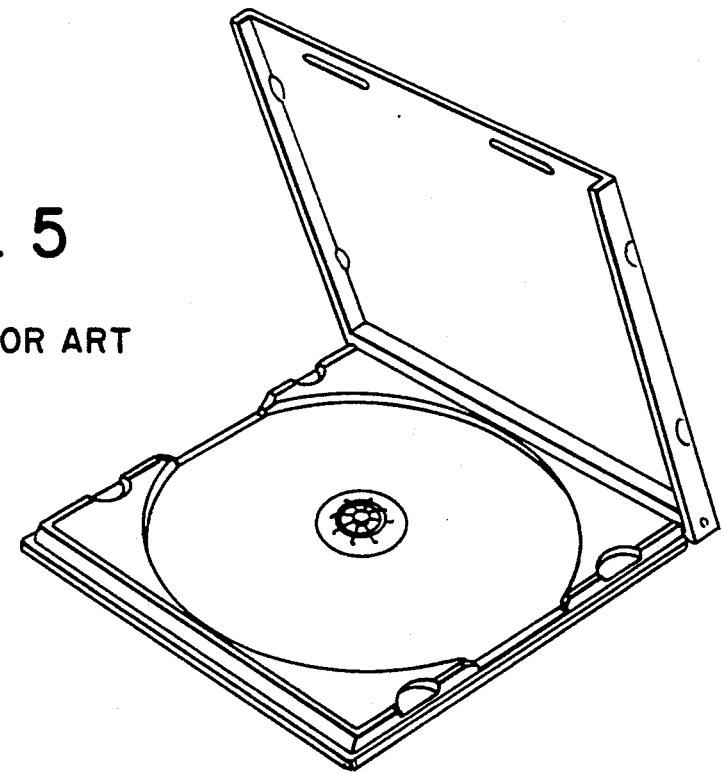
FIG. 5 is a perspective view of a conventional hinge type disc storage case.

In the other embodiment as shown in FIGS. 3 and 4, the bracket type key 17 has a coupling means 25 which is slidably coupled to rail groove 15. The key 17 is pivotally fixed on the bottom surface, of the drawer plate 5 by pivot pin 18. The coupling means 25 reaches the upper dead point 20' (see FIGS. 4(B) and 4(C) along o e direction of the rail groove 15 formed in the case 1 by a single touch. The case is thus automatically locked when closed. When the bracket type key 17 is released out of the upper dead point 20', the rear end surface 23 of the drawer plate 5 is pushed out of a resilient force the leaf spring 16 whereby the coupling bracket type key 17 travels from the upper dead point 20' along the rail groove as shown in FIGS. 4(C) and 4(D) and reaches the lower dead point 21' (see FIG. 4(A) and 4(C) and the drawer is opened.

The one way rail groove 15 is formed with step differences of several heights shown in FIG. 4(D) which prevent the bracket type key 17 from leaving the groove (see FIG. 4(D). The leaf spring 19 operates to push the bracket type key 17 long the groove. If the drawer plate 5 is opened, the stepped sill 7, on bottom surface of the drawer plate, is hooked up by the hooking protrusion 4 of the case 1 thereby preventing the drawer from being removed from the case.

Thus, according to the present invention, since the disc storage drawer is automatically locked when closed and automatically opened when released by a single touch, the disc can be removed by a single touch. Also, since the opened drawer plate cannot be released from the case, the case remains at its stored or arranged place. Therefore the invention is very efficient and convenient both spatially and in removal and replacement time.

It will be appreciated that the present invention is not restricted to the particular embodiment that has been described hereinbefore, and that variations and modifications may be made therein without departing from the spirit and scope of the invention as defined in the appended claims and equivalents thereof.

I claim:

1. A single touch drawer opening and closing device for a compact disc storage case, said case having a drawer which is inserted at an inserting opening on a front surface of a box-like body, said single touch drawer opening and closing device comprising:

a lock including a key guiding means operated in a one way direction, said lock is provided at an innermost right side of said box-liked body;

a hooking protrusion located at a front side of a right inner wall of a disc storage space; and a stepped sill located on said drawer, said stepped sill is located at a recessed bottom surface of said drawer, wherein said drawer is automatically locked when said drawer is closed and is automatically opened when the drawer is released by a single touch, and said stepped sill preventing said drawer from being removed from the case when the drawer is automatically opened.

2. A single touch drawer opening and closing device for a compact disc storage case according to claim 1, wherein said lock further comprises:

a triangular plate mounted within the lock, said key guiding means formed around the triangular plate, first hooking means formed with a protuberance at a front end, said hooking means is pivotably mounted on a pivot pin, a slide means movably mounted with a second hooking means formed with hooking projections at stepped portion of both corners of a front side of the slide, a compression spring for urging the slide, and a five sided flat plate key formed with locking protuberance which are grasped by said hooked projections of said second hooking means, said five sided flat plate key is mounted at an innermost right side on a bottom surface of the drawer.

3. A single touch drawer opening and closing device of a compact disc storage case according to claim 1, wherein several steps of said stepped sill are formed at a bottom surface of an innermost right side of the case, a rail groove is formed on a bottom of said case, said rail groove having a one way direction, a leaf spring is fixed at an inner wall of an innermost side of said case, and bracket type key is pivotably mounted by a pivot pin at an innermost right side on a bottom surface of the drawer, said bracket type key urged by said leaf spring around said rail groove.

* * * * *